United States Patent Office 3,253,108
Patented May 24, 1966

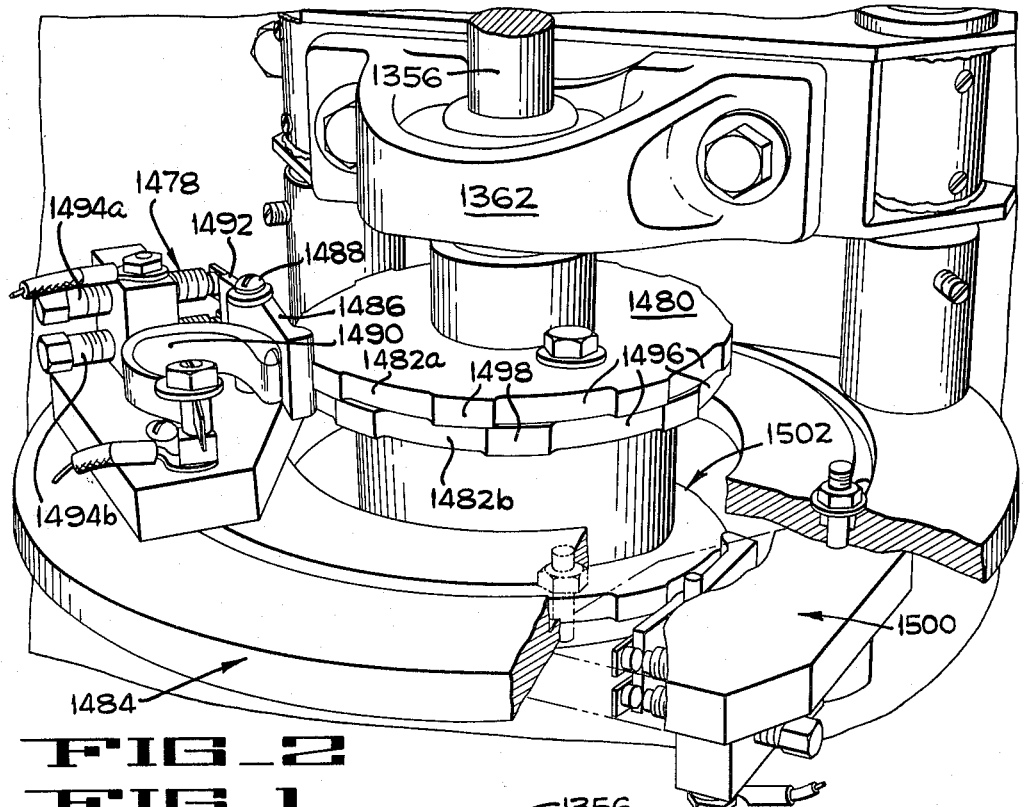
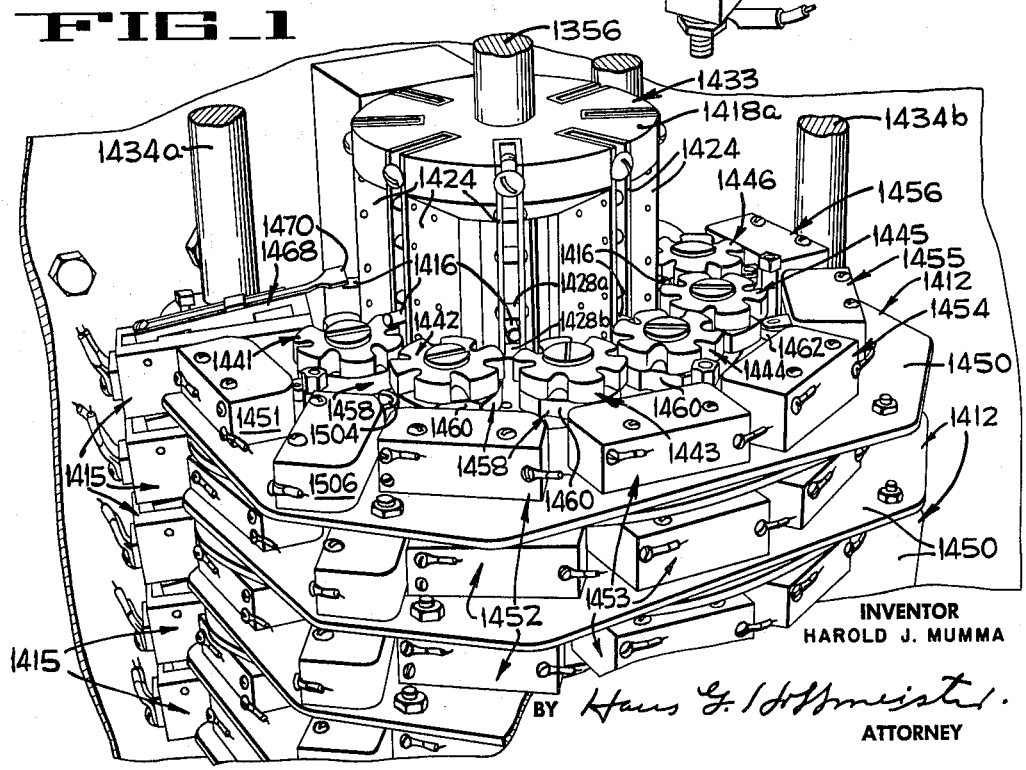
FIG_2
FIG_1
INVENTOR
HAROLD J. MUMMA
BY Hans G. Hoffmeister
ATTORNEY May 24, 1966        H. J. MUMMA        3,253,108
SIGNAL STORING AND CONTROL DEVICE
Original Filed Dec. 28, 1953        3 Sheets-Sheet 2
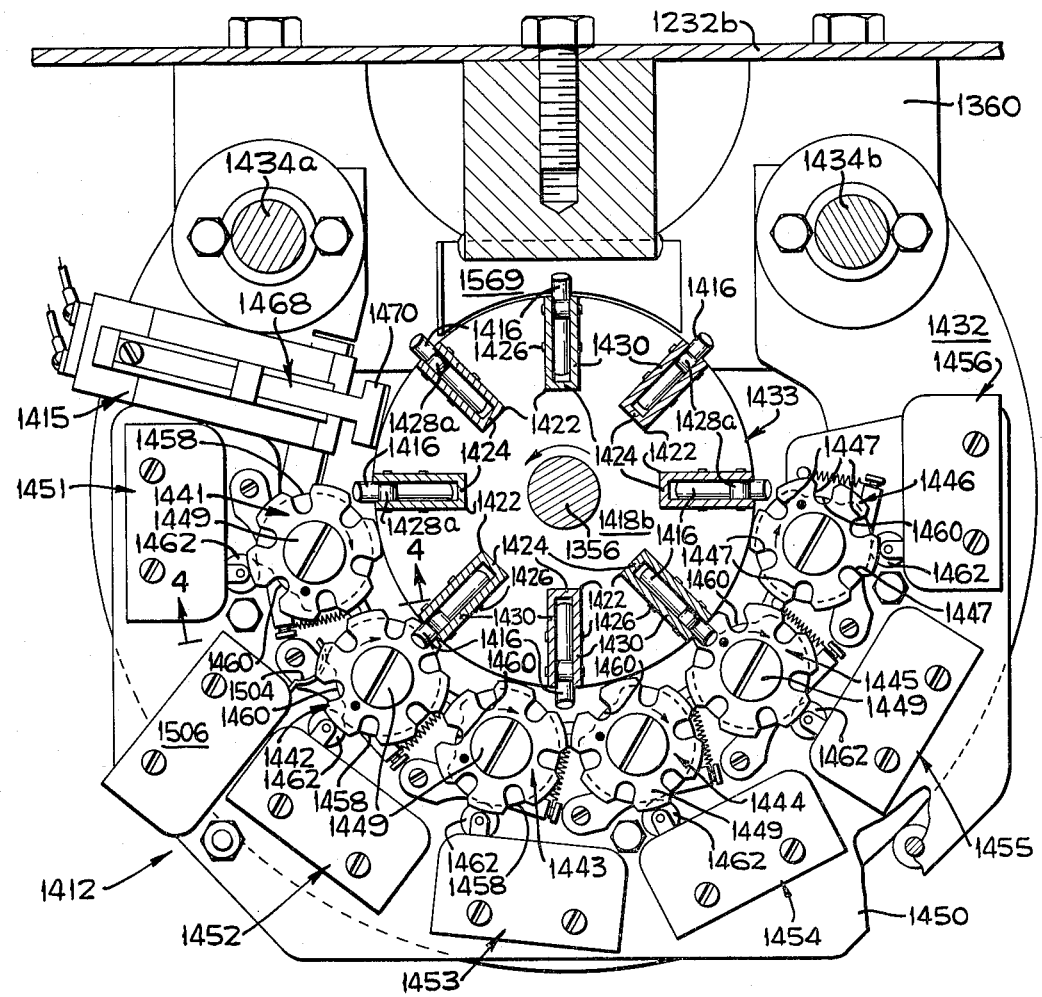
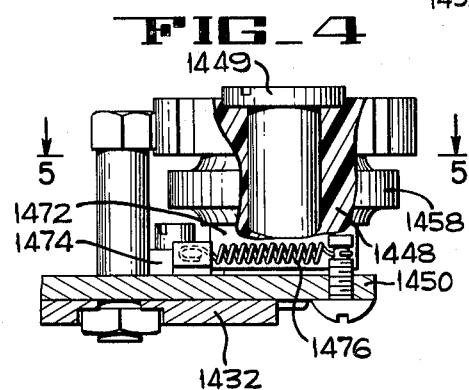
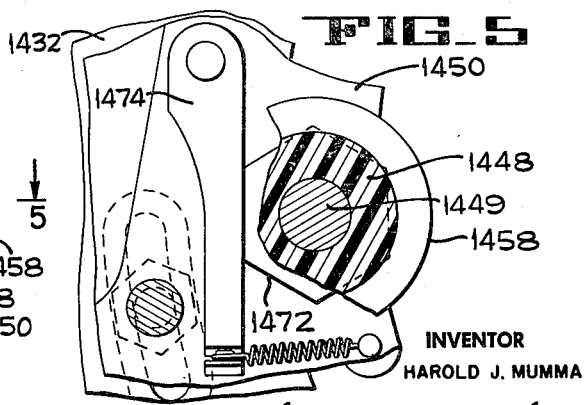
INVENTOR
HAROLD J. MUMMA
BY *Hans G. Hoffmeister*
ATTORNEY

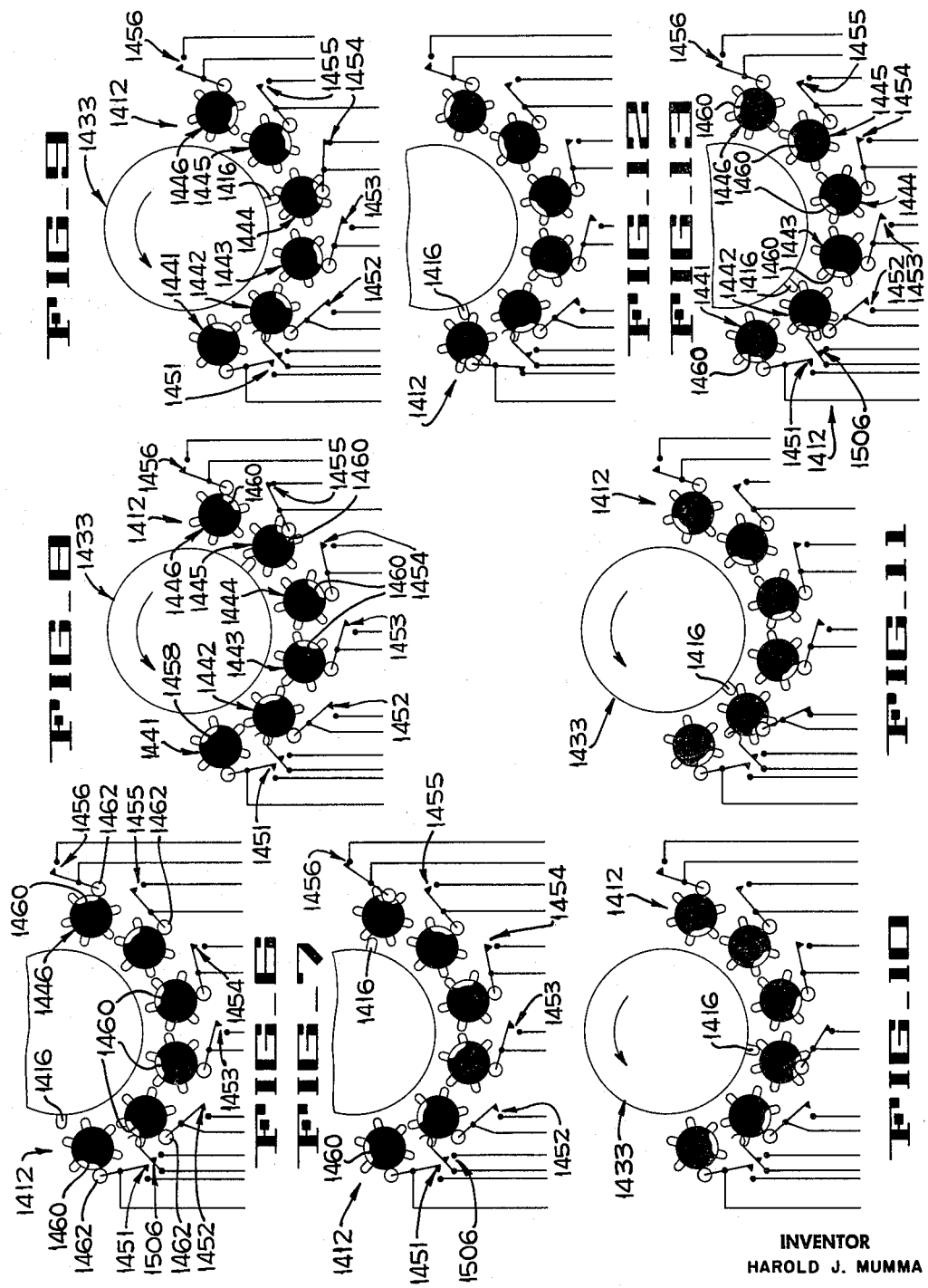

3,253,108
SIGNAL STORING AND CONTROL DEVICE
Harold J. Mumma, Riverside, Calif., assignor to FMC Corporation, a corporation of Delaware
Application May 15, 1959, Ser. No. 813,547, which is a division of application Ser. No. 400,466, Dec. 28, 1953, now Patent No. 2,895,274, dated July 21, 1959. Divided and this application Jan. 20, 1964, Ser. No. 345,552
6 Claims. (Cl. 200—153)

This application is a division of my copending application, U.S. Serial No. 813,547, filed May 15, 1959, for Memory Device for a Machine for Handling Eggs. The copending application Serial No. 813,547 is a division of application Serial No. 400,466, filed December 28, 1953, now Patent No. 2,895,274.

The present invention relates in general to machines for handling eggs, and more particularly to a memory device adapted for use in egg handling machines.

An object is to provide a rotary control device having members operable to be set into effective position representative of an egg and operative when in effective position to drop eggs from a conveyor at predetermined points thereof.

Another object is to provide an arrangement for a rotary control device operable to dependably set representative members thereof into effective position even though the rotary control device may travel at high speeds.

Another object is to provide an improved data storage device that is particularly adapted for use in the processing of eggs or other similar articles.

These and other objects of the present invention will be apparent from the following description of the accompanying drawings which illustrate a preferred embodiment thereof and wherein:

FIG. 1 is a fragmentary perspective of the secondary control mechanism, of the present invention, which is associated with and is controlled from a memory belt and which determines the exact point of release of the eggs from a distributing conveyor.

FIG. 2 is a fragmentary perspective similar to FIG. 1 illustrating the bottom end of the mechanism shown in FIG. 1.

FIG. 3 is a horizontal section taken through the secondary control mechanism in FIG. 1.

FIG. 4 is a fragmentary detail view illustrating a component part of the mechanism shown in FIGS. 1 and 3 as viewed in the direction of the arrows 4—4 shown in FIG. 3.

FIG. 5 is a fragmentary horizontal section through the mechanism shown in FIG. 4 taken along line 5—5 of FIG. 4.

FIGS. 6–13, inclusive, are schematic views of the mechanism shown in FIG. 3 illustrating eight consecutive operational phases thereof.

Briefly, the egg handling machine with which the memory device control of the present invention is associated includes candling stations at which individual operators visually determine the external and internal condition of eggs and then feed the eggs into the machine on individual racks for each of eight quality grades. At each candling station the eggs automatically feed from the quality racks into cups of an elevator conveyor at the station and thereby actuate mechanisms that register the quality of the egg, as represented by the rack onto which it was deposited by the candler, upon a rotary control device termed a memory belt. The memory belt serves all candling stations and is divided into a multitude of consecutive horizontally extending strip-shaped sectors, and each elevator cup is represented by one sector of the memory belt. The memory belt is moved in timed relation with the elevator cups and, when an egg passes from one of the eight quality racks into an elevator cup of the particular elevator associated with the candling station, the above mentioned registration mechanism sets a movable pin, which is supported upon the sector of the memory belt that corresponds to the particular elevator cup, to register the quality of the egg. Each elevator delivers the eggs onto a weighing mechanism which is arranged to set a second movable actuating pin, that registers the weight group to which that egg belongs, in the same sector of the memory belt that previously recorded the quality of the egg.

From each weighing mechanism, the eggs are delivered onto a distributing conveyor that carries an endless sequence of egg buckets which move the eggs through an oiling station wherein eggs of selected quality and weight combinations are subjected to an oil spraying to preserve their freshness. Downstream of the oiling station, the conveyor extends over eighteen consecutive packing stations to which it distributes eggs. Each packing station is adapted to receive eggs of a particular quality-weight combined characteristic. Accordingly, eggs of the same pre-selected weight and quality combinations are deposited at pre-determined ones of said packing stations into suitable cardboard containers such as egg cartons or grids, the latter having six pocket rows with six pockets in each row, and the former having two pocket rows with six pockets in each row. Each egg is released from its supporting bucket at a preselected packing station as the egg approaches an empty pocket in the carton positioned underneath the distributing conveyor at the packing station. If the pocket row of the carton is entirely empty, the first incoming egg designated for that pocket row is discharged from the conveyor for delivery into the pocket at the downstream end of the pocket row, and succeeding eggs of the same weight and quality combination on the conveyor are successively dropped into the remaining five pockets in an upstream direction. Whenever an egg reaches a pre-determined point upstream of the packing station at which it is to be dropped, its representative pins on the memory belt cause the egg to be registered on a secondary or auxiliary memory device 1412 (FIGS. 1–3) that is individual to each packing station, and which operates in synchronism with both the distributing conveyor and the memory belt.

The entire egg processing machine, of which the signal storing and control device is a part, is completely described in the above mentioned Patent No. 2,895,274 and, accordingly, the specification of said patent is incorporated by reference herein to provide a description of any parts not described herein.

From that moment on, it is said secondary memory device 1412 that assumes representation of the egg and which operates to cause its release from the distributing conveyor at the proper moment as it passes over the carton or cardboard grid beneath, depending on how many eggs, if any, have previously been deposited into the aligned pocket row.

The eighteen juxtapositioned packing stations in the egg handling machine are each of a width equal to the total length of six consecutive buckets on the distributing conveyor and sectors of the rotary orbit of the memory belt correspond to the eighteen auxiliary memory devices 1412. At each of said sectors that represent the weight and the quality of the eggs which are to be packaged at said particular packing stations are normally open switches. The first of the eighteen packing stations is to receive eggs of A Brown quality and small size, and in other packing stations, it may be desired to pack all eggs of a certain quality, disregarding their size, into cartons or cardboard grids or to pack eggs of several different qualities and/or several different sizes. Thus, the second packing station may be intended to handle eggs classed as "Heavy Dirty," disregarding their sizes, and, accordingly, a switch is supported at the sector of the memory belt orbit which represents the quality "Heavy Dirty." As another example, the fifth packing station may be intended to handle eggs of the quality grades AA, A White, A Light Dirty, A Brown, and A Cream that are of peewee size. Accordingly, in the sector of the memory belt orbit which corresponds to the fifth packing station, a plurality of corresponding switches are mounted.

As pointed out hereinbefore, all of said switches are normally open and are briefly closed when they encounter activated pins in their respective pins rows of the continuously operating memory belt. In each of the eighteen sectors corresponding to the eighteen consecutive packing stations, the switches that represent quality and weight are connected in series and form part of the power circuit of a solenoid 1415 (FIGS. 1 and 3). Upon energization, said solenoid 1415 operates to activate a memory pin 1416 in the secondary memory device 1412 corresponding to the packing station which is represented by the particular sector of the primary memory belt orbit in which are located the quality and weight switches that caused its energization. To energize such a solenoid 1415, it is necessary in all but that sector of the memory belt orbit which corresponds to packing station #2, that at least one of the quality switches and one of the weight switches in its power circuit be closed simultaneously, this occurs only when an egg that has both the selected quality and the selected weight approaches a packing station. In the unique case illustrated by packing station #2 where all eggs graded as "Heavily Dirty" are to be packed together irrespective of weight, the power circuit of the solenoid 1415 requires only a single quality switch that represents the quality grade "Heavily Dirty" and needs no switches representative of weight. The solenoid 1415 associated with packing station #2 will, therefore, be energized whenever its single switch is closed.

Whenever a solenoid 1415 has been energized and has shifted a secondary memory pin 1416 in the secondary memory device 1412 into effective position, it is said shifted secondary memory pin 1416 that takes over representation of the particular egg instead of the memory belt components that caused energization of the shift-effecting solenoid 1415. Having reference to FIGS. 1–3, the eighteen secondary memory devices 1412 in the illustrated embodiment of the invention are all mounted upon and driven from a vertical shaft 1356 which is geared to the memory belt. Supported from the vertical shaft 1356 for rotation therewith are an upper and a lower pair of vertically spaced mounting discs, the upper pair 1418a, 1418b only being shown in FIGS. 1 and 3. Each disc is provided with eight equi-spaced angularly aligned radial retaining slots 1422. Secured within the angularly aligned slots 1422 of each of the upper and lower pairs of mounting discs are eight vertically disposed channels 1424, the channels of the upper pair of discs being in superposed relation to the channels of the lower pair of discs to form composite channels. Pivotally supported within each composite channel in vertically spaced relation are eighteen secondary memory pins 1416, one for each of the eighteen packing stations comprised in the disclosed embodiment of the invention. Said pins 1416 are arranged for rotation about individual pivots 1426, such rotation being positively limited by studs 1428a and 1428b that are mounted within the side flanges 1430 of said channels above and below the pins, as best shown in FIGURE 1.

Disposed below each of the eighteen circular rows of secondary memory pins 1416, formed by the pins projecting from the channels 1424 at equal altitudes, is a base plate 1432 (FIG. 3) of roughly horseshoe shape, said plates being arranged to embrace a rotor 1433 formed by the composite channels 1424 of the upper and lower pairs of discs, as partially shown in FIG. 1. Said plates may be supported at their ends from two vertical rods 1434a and 1434b that are held by brackets such as bracket 1360 (FIG. 3), which are mounted on a side panel 1232b of a cabinet which encloses the memory belt.

Arranged along the inner edge of each of the eighteen horseshoe plates 1432 for driving engagement by the pins of the aligned circular pin rows 1431 is a semi-circular row of six Geneva gears 1441, 1442, 1443, 1444, 1445 and 1446 (FIG. 3). Each of said Geneva gears has six angularly equi-spaced notches 1447 corresponding to the six egg discharge effecting solenoids at each packing station and is adapted to be operatively engaged by the protruding ends of the secondary memory pins 1416 in the aligned circular pin row 1431, when said pins are in effective position. Each Geneva gear (FIGS. 4 and 5) has a tubular stem 1448 that turns upon a vertical stud 1449 which rises from a common U-shaped mounting plate 1450 that is adjustably held upon the horseshoe plate 1432. Arranged along the outer periphery of the semi-circle formed by the six Geneva gears on each horseshoe plate 1432 are six switches 1451, 1452, 1453, 1454, 1455 and 1456 (FIGS. 1 and 3) that lie in the individual power circuits of the above-mentioned six egg discharge effecting solenoids disposed adjacent the particular packing station with which a particular secondary memory device 1412 is associated. Said switches 1451 to 1456 are bolted to the U-shaped mounting plate 1450 and their condition is controlled by cams 1458 formed on the stems 1448 of the Geneva gears, depending upon the rotary position of said gears. The edges of said cams each have a solitary depression 1460, as shown in FIGURE 3, and as long as a roller 1462 provided to actuate each of said switches rides on the circular contour 1466 of its respective cam, the switch is held in open position, but when the roller drops into said depression 1460, the switch will close.

It will be seen that each packing station, and hence the eggs designated for that packing station, is represented by one of the secondary memory devices 1412, and that each secondary memory device includes one mounting plate 1432, one circular row of substantially coplanar secondary memory pins 1416 and Geneva gears 1441–1446, one pin-setting solenoid 1415, and various electrical switches adjacent the Geneva gears for controlling discharge of the eggs from the egg distributing conveyor to that packing station.

During operation of the machine the rotor 1433 (FIG. 3) turns in counterclockwise direction in synchronism with both the distributing conveyor and the memory belt such that in a given time interval the same number of secondary memory pins 1416 will pass a given stationary point as do the buckets on the distributing conveyor and switch actuating pins on the memory belt. During rotation of said rotor 1433, the pins 1416 projecting from the channels 1424 sweep ineffectively above their respective rows 1431 of Geneva gears as long as they are in their upwardly tilted ineffective position as determined by engagement with their upper limit studs 1328a. Mounted upon each horseshoe plate 1432, however, ahead of the first Geneva gear 1441 is the hereinbefore mentioned solenoid 1415 that may be energized by closure of at least one quality switch and at least one weight switch in the sector of the memory belt orbit that corresponds to the particular packing station at which the secondary memory device about to be described controls the discharge of eggs from the distributing conveyor. The solenoids 1415 have actuating ends on their armatures 1468 which are preferably formed in the manner of the cross bar of a T as shown at 1470 in FIGS. 1 and 3. With a solenoid 1415 in deenergized condition, said cross bar 1470 is positioned slightly above the level of the circular row of secondary memory pins 1416 with which the solenoid is associated, as shown in FIG. 1. Upon energization of the solenoid 1415, however, coincident with the passage of a secondary memory pin 1416, the cross bar 1470 of its armature bears down upon the passing pin, and shifts the pin into its downwardly tilted effective position, wherein upon further rotation the pin will successively engage and advance every one of the six Geneva gears upon the adjacent horseshoe plate 1432 over a limited increment.

The six Geneva gears upon each of the horseshoe plates 1432 are adjusted to such rotary positions relative to each other that the depressions 1460 in the cams 1458 of consecutive gears, counting backwards from the last gear 1446, trail behind each other by rotary increments equal to the rotary increments by which the gears are advanced when effectively engaged by a secondary memory pin. Initially, i.e., before an egg has been dropped into any of the pockets in the pocket row of a carton or cardboard grid that is held below the distributing conveyor at the corresponding packing station, the Geneva gears are in the position illustrated in FIG. 6 wherein the sixth Geneva gear, i.e., the gear 1446 that is last engaged by a secondary memory pin 1416 in depressed condition, is in such a rotary position that the depression 1460 of its cam 1458 lies directly in front of the roller 1462 of its associated switch 1456 which is the switch that closes the power circuit of the last one of the set of bucket opening solenoids on the downstream side of the packing station. Thus, whenever the solenoid 1415 depresses a secondary memory pin 1416 indicating that an egg of the quality and weight combination to be packed at said particular packing station approaches said station on the distributing conveyor, consecutive engagement of said depressed pin 1416 with the consecutive Geneva gears 1441 to 1446 will advance all of said gears by a limited increment which remains without effect upon the switches 1451 to 1455 associated with the first five Geneva gears 1441 to 1445, respectively, but causes the roller 1462 of the sixth switch 1456 to drop briefly into the depression 1460 in the cam of the sixth Geneva gear 1446, as illustrated in FIG. 7. This closes said switch 1456 temporarily, and as a result thereof the above-mentioned last solenoid at the very moment when the bucket carrying the egg which started the described sequence of operations approaches said solenoid, because the pins 1416 of the secondary memory device 1412 advance in synchronism with the advance of the buckets on the distributing conveyor. Hence, that egg will drop into the last pocket of the pocket row presented to the distributing conveyor at the particular packing station.

As previously pointed out, however, passage of the above-described secondary memory pin 1416 in depressed condition past the Geneva gear not only advanced the last Geneva gear 1446, but also advanced each of the five preceding gears 1441 to 1445 by the same increment so that it is now the fifth Geneva gear 1445 that holds the depression 1460 of its cam 1458 directly in front of the roller 1462 of its associated switch 1455. Hence, when the pin activating solenoid 1415 is again energized in the manner already mentioned, and depresses another secondary memory pin 1416, said pin while advancing all the Geneva gears by equal rotary increments will cause the fifth Geneva gear 1445 to effect closure of its respective switch 1455 (FIG. 8) with resultant energization of the next upstream solenoid.

As best illustrated in FIG. 3, the fifth Geneva gear 1445 is spaced from the sixth Geneva gear 1446 by an angular interval that is smaller than the angular interval between each two consecutive secondary memory pins 1416 by a ratio equal to the ratio of the linear interval between the center points of consecutive egg receiving carton pockets to the linear interval between the center points of consecutive egg buckets on the distributing conveyor. Measured in angular distance, the fifth Geneva gear 1445 is, therefore, closest to the sixth and last Geneva gear 1446 than the angular interval between two directly consecutive pins 1416, and the second pin 1416 in depressed condition must, therefore, travel a longer distance counted from the point that corresponds to the sector of the memory belt orbit wherein the described sequence of operations is started, to the fifth Geneva gear 1445 than corresponds to the linear dimension of five consecutive buckets on the distributing conveyor. As a result thereof, the bucket that carries the egg which initiated the sequence of operations that resulted in depression of the secondary memory pin 1416 will travel a distance slightly larger than five buckets from the point on the distributing conveyor where its representative pins on the memory belt released control over its egg, until its representative pin 1416 on the secondary memory device effects energization of the fifth bucket opening solenoid through actuation of the fifth Geneva gear 1445. The egg bucket will, therefore, reach said bucket opening solenoid at the very moment it is energized to drop the second egg of the proper quality and weight into the fifth carton pocket, which is the second pocket counted from the downstream side of the packing station.

As the solenoid 1415 depresses additional secondary memory pins 1416 indicative of the fact that additional eggs of the selected weight and quality combination are approaching the packing station, the Geneva gears 1441 to 1446 are consecutively advanced by additional increments causing in succession energization of the fourth, third, second and first bucket opening solenoids which open succeeding egg buckets as they carry eggs of the selected quality and weight over the fourth, third, second and first carton pocket counted from the upstream side of the distributing conveyor. In this manner all the pockets in the pocket row of a carton underneath are successively filled with eggs of the proper weight and quality.

To prevent overthrow of any one of the Geneva gears during actuation thereof, the stem 1448 (FIG. 5) of each of said Geneva gears is arranged to form below its switch actuating cam 1458 a six-sided locking cam 1472, one side for each of the six actuating notches 1447 (FIG. 3) in the edge of the gear, and a pawling arm 1474 pivotally mounted upon the U-shaped plate 1450 adjacent each gear is yieldably held against the edge of said locking cam 1472 by means of a coil spring 1476 as illustrated in FIG. 5.

To avoid misoperation of the described mechanism, it will be apparent that the pin shifting solenoids 1415 comprised therein must be energized at the very moment when a vertical row of secondary memory pins 1416 passes by, because premature energization of a solenoid 1415 would cause the T-bar 1470 of its armature 1468 to pass ineffectively underneath the pin that it should have depressed. To accurately time the energization of the solenoids 1415 with the passage of the vertical pin rows, a master switch 1478 (FIG. 2) is connected in series with said solenoids 1415, and the position of said master switch is controlled by a cam 1480 formed by two relatively adjustable, superposed cam discs 1482a and 1482b that are mounted upon the main shaft 1356 of the secondary memory mechanism, such that the master switch 1478 is normally open, but is allowed to close briefly at the very moment when a vertical pin row passes by the superposed solenoids 1415 upon the eighteen superposed horseshoe plates 1432 comprised in the egg handling machine.

Having reference to FIG. 2, said master switch 1478 is mounted upon an annular base plate 1484 which surrounds the shaft 1356 near the bottom end thereof, and comprises a conductive lever 1486 that is mounted for rotation about a vertically disposed stud 1488. Said lever has its tail end engaged by a conductive spring 1490 which urges a double-pronged nose 1492 thereof into contact with the ends of two parallel adjustable contact bolts 1494a and 1494b. On the side opposite the spring 1490, however, the tail end of lever 1486 engages the contour of the cam 1480 at a point angularly aligned with the T-bars 1470 of the eighteen vertically superposed pin shifting solenoids 1415. The edge of the cam 1480 forms a sequence of equally spaced recesses 1496 that are in angular alignment with the vertical pin rows 1416. When the tail end of the switch lever 1486 is engaged by the lobes 1498 formed between each two consecutive recesses 1496 in the edge of the cam 1480, the switch 1478 is held open, but when it drops into the recesses 1496 under the urgency of spring 1490—which is the case whenever a pin row passes by the armatures 1468 of the eighteen superposed solenoids 1415—the switch 1478 is momentarily closed. It is only then that any one of the solenoids 1415 may be energized by actuation of the quality and weight switches by the representative pins with the proper weight and quality setting through corresponding sectors of the memory belt orbit.

To accurately time the previously mentioned oiling operation of individual eggs so that a jet of oil ejected from the oiling nozzle will be confined to the egg for which it is intended, a similar master switch 1500 (FIG. 2) may be connected in series into the power circuit of the solenoid that controls the valve for the oil spray nozzle. Said switch 1500 may be supported from the under side of the same annular plate 1484 upon which the master switch 1478 for the pin setting solenoids 1415 is mounted, and may be controlled from a cam 1502 that is similar to cam 1480 and which is likewise mounted upon the main shaft 1356 of the secondary memory device.

Reverting to the operation of the secondary memory device, after all six switches 1451 to 1456 of one of the eighteen auxiliary memory mechanisms 1412 have been consecutively closed in a direction opposite to the order named, and all six pockets of a pocket row presented to the distributing conveyor at a particular packing station have been filled with eggs of the proper weight and quality, the carton or cardboard grid which forms said pocket row must be shifted so that a consecutive row of pockets will lie below the distributing conveyor before another egg of the proper weight and quality is released from said conveyor under control of the secondary memory mechanism. Means are, therefore, provided in accordance with the invention that cause advance of the carton or cardboard grid underneath the distributing conveyor so as to place a new row of pockets underneath said conveyor whenever an egg has been dropped into the last pocket of the preceding pocket row, which is the pocket on the upstream side of the packing station. Release of the egg that dropped into said last pocket was effected by operative engagement of a depressed secondary memory pin 1416 with the first Geneva gear 1441 in the sequence of six Geneva gears, which engagement caused temporary closure of the switch 1451 that energizes the first solenoid of the bucket opening solenoids adjacent the distributing conveyor at the particular packing station. After having actuated said first Geneva gear 1441 (FIG. 12), the depressed pin 1416 engages and advances consecutively all the remaining Geneva gears 1442–1446, as previously explained. The incremental advancement of the second Geneva gear 1442 by said memory pin 1416 is arranged to move the depression 1460 in cam 1458 of said gear 1442 past the arched actuating end 1504 (FIGS. 3 and 13) of another normally open switch 1506 to cause brief closure thereof. Each of the U-shaped plates 1450 carries such a switch 1506 between the first and second egg releasing switches 1451 and 1452, respectively, as shown in FIGS. 1 and 3, and each such switch 1506 lies in the power circuit of a relay which, as described in the previously identified parent application, causes the egg carton to be moved so that an empty row of pockets are disposed in filling position.

When the secondary memory pin 1416 that caused release of the last or sixth egg into the last pocket of a pocket row has passed the second Geneva gear 1442 where it initiated the above described operations for placing another row of pockets underneath the distributing conveyor, it passes all the remaining Geneva gears 1443–1446 advancing them by rotational increments corresponding to the angular distance between two consecutive ones of their notches, and in passing the sixth Geneva gear 1446 it places the same into its initial position, as illustrated in FIGURE 6, wherein the switch actuating depression 1460 in its cam 1458 lies again directly ahead of the actuating roller 1462 of the power switch 1456 for the sixth egg releasing solenoid 686. Hence, engagement of said sixth Geneva gear by a subsequent memory pin 1416 in depressed condition will cause said sixth egg releasing solenoid to drop a first egg into the next pocket row presented to the distributing conveyor at the particular packing station. Thus, when another egg of the proper weight and quality approaches the packing station here under consideration and causes energization of the pin setting solenoid 1415 corresponding to said station, the secondary memory pin 1416 depressed by energization of said solenoid will have to travel all the way to the sixth Geneva gear 1446 before it causes energization of an egg release solenoid. The next egg released from the distributing conveyor at the particular packing station is dropped into the sixth pocket on the downstream side of a new pocket row that has meanwhile been moved below the distributing conveyor. Due to the fact that a pocket row receives its last egg from the distributing conveyor at the upstream side of the packing station, and the next egg of the same quality and weight combination, which is the first egg to be dropped into the succeeding pocket row, is dropped into the pocket on the downstream side of the packing station, ample time is provided for the operations that move a new carton row into egg receiving position below the distributing conveyor even if the next egg to be discharged from the distributing conveyor at the particular packing station follows directly behind the egg that was dropped into the last pocket of the preceding pocket row.

When a secondary memory pin 1416 (FIG. 3) in depressed condition has consecutively passed and actuated all six Geneva gears 1441 to 1446, it must be returned to its ineffective position so that it may again represent an egg that is to be discharged from the distributing conveyor at the particular packing station represented by said same six Geneva gears. For this purpose, upwardly slanting camming plates 1569 are provided at the rear end of the rotor 1433 formed by the vertically disposed channels 1424 adjacent each circular row 1431 of memory pins 1416. Thus, after a depressed pin has passed the sixth Geneva gear 1446, it slides over the lower end of a cam plate 1569 and as the pin continues its rotary course, it is cammed upwardly into its ineffective position.

While I have described my invention with the aid of a particular embodiment thereof, it will be understood that I do not wish to be limited to the specific constructional details illustrated and described which may be departed from without departing from the spirit of the invention.

Also, while my invention as illustrated in the accompanying drawings and as described in the specification was specifically devised and is employed in the processing of eggs, it will be understood that the principles of the invention may also be usefully employed in the separation of other articles, such as avocadoes, lemons, or other highly priced fruit.

Having thus described my invention, what I claim as new and desire to protect by Letters Patent is:

1. A signal storage device comprising a frame, a rotor mounted in said frame, a circular row of actuator pins carried by said rotor, each of said pins being movable between effective and ineffective positions while moving with said rotor, means for rotating said rotor, a plurality of Geneva gears rotatably mounted on said frame about the periphery of said rotor, said gears lying in a transverse plane of said rotor and in the plane of the effective ones of said actuator pins, said gears being individually, successively and incrementally rotated by the effective ones of said actuator pins carried therepast by said rotor, a switch mounted on said frame adjacent each of said gears, a cam rotatable with each of said gears and engageable with the associated switch upon a predetermined number of incremental rotational movements of said gear, and electromagnetic means on said frame operable to selectively move said actuator pins from ineffective to effective positions.

2. For use in connection with an endless conveyor having spaced article carrying buckets for successively distributing articles into a row of pockets of a carton, which pockets have a spacing that is a fraction of the conveyor bucket spacing; a combined discharge signal storing and conveyor bucket control device comprising a movable signal responsive element, means connecting said signal responsive element to move synchronously with the conveyor, a plurality of movable actuators carried by said signal responsive element and spaced apart by distances proportionate to the conveyor bucket spacing, said actuators being movable between effective and ineffective positions, a plurality of signal storage members equal in number to the number of pockets in a carton row and intermittently shiftable by the effective ones of said actuators, a plurality of spaced actuator-responsive elements on each signal storage member lying in the paths of said effective actuators and equal in number to the number of pockets in a carton row, said effective actuators being arranged to shift each of said signal storage members an increment proportionate to the distance between adjacent carton pockets, the ratio of the spacing of said signal storage members to the spacing of said actuators equaling the aforesaid fraction, a bucket-discharge signal-receiving device for selectively placing said actuators into said effective positions for actuating the actuator-responsive elements on said signal storage members, a conveyor bucket discharge signal transmitting device associated with each signal storage member, and a single discharge signal transmitting device-operating element simultaneously shiftable with each of said signal storage members and engageable with the corresponding one of said bucket discharge signal transmitting devices, said operating elements being relatively and progressively staggered for sequentially shifting said signal storage members in correspondence with consecutive carton row pockets.

3. For use in connection with an endless conveyor having spaced article carrying buckets for successively distributing articles into a row of pockets of a carton, which pockets have a spacing that is a fraction of the conveyor bucket spacing; a combined discharge signal storing and conveyor bucket control device comprising a movable signal responsive element, means connecting said signal responsive element to move synchronously with the conveyor, a plurality of movable actuator pins carried by said signal responsive element and spaced apart by distances proportionate to the conveyor bucket spacing, said actuators being movable between effective and ineffective positions, a plurality of Geneva gear type signal storage members equal in number to the number of pockets in a carton row and intermittently rotatable by the effective ones of said actuator pins, a plurality of spaced teeth on each signal storage member lying in the paths of said effective actuator pins and equal in number to the number of pockets in a carton row, said effective actuator pins being arranged to engage said teeth and rotate each of said gears an increment proportionate to the distance between adjacent carton pockets, the ratio of the spacing of said teeth to that of said pins equaling the aforesaid fraction, a bucket discharge signal receiving device for selectively placing said actuator pins into said effective positions wherein the pins rotate said signal storage members, a conveyor bucket discharge signal transmitting device associated with the operating element of each signal storage member, and a signal discharge signal transmitting device operating element simultaneously rotatable with each of said signal storage members and engageable with the corresponding one of said bucket discharge signal transmitting devices, said operating elements being relatively and progressively rotationally staggered for sequentially actuating said signal transmitting device to effect discharge of articles into consecutive carton row pockets.

4. The control device of claim 3 wherein said movable signal responsive element is a rotatable disc-like member.

5. For use in connection with an endless conveyor having spaced article carrying buckets for successively distributing articles into a row of pockets of a carton, which pockets have a spacing that is a fraction of the conveyor bucket spacing; a combined signal storing and conveyor bucket control device comprising a frame, a signal responsive rotor rotatably mounted in said frame, means for driving said rotor synchronously with the conveyor, a plurality of movable actuator pins uniformly spaced on said frame around said rotor by a distance proportionate to the conveyor bucket spacing, a plurality of Geneva gear type signal storage members rotatably mounted on said frame about the periphery of said rotor, said gears being equal in number to the number of pockets in a carton row, each of said gears being provided with a plurality of spaced teeth equal in number to the number of pockets in a carton row, the ratio of the spacing of said teeth to that of said actuator pins equaling the aforesaid fraction, a bucket discharge signal-receiving solenoid on said frame for selectively moving said actuator pins into effective positions to engage said teeth and thereby rotate said signal storage members, a cam operated conveyor bucket-discharge switch mounted on said frame adjacent each signal storage member, and a switch cam mounted on and rotatable with each signal storage member, said cams being relatively and progressively rotationally staggered around their axes of rotation so that successive switches actuate successive buckets to discharge articles into successive carton pockets.

6. A data storage and control device comprising a rotor, a circular row of pins supported from said rotor, means for rotating said rotor, a plurality of Geneva gears rotatably mounted in an arc around said rotor in such manner that the recesses in the peripheries of said Geneva gears are drivingly engaged by the pins of said rotor, switches associated with said Geneva gears, and means carried by said Geneva gears adapted to actuate said switches upon a predetermined rotative movement of said gears.

No references cited.

ROBERT K. SCHAEFER, *Primary Examiner.*